DATA TRANSMISSION SYSTEM

Filed Aug. 29, 1961

INVENTORS W. R. BENNETT
F. E. FROEHLICH

J. P. Kearns, Jr.

ATTORNEY

United States Patent Office 3,157,741

Patented Nov. 17, 1964

3,157,741

DATA TRANSMISSION SYSTEM

William R. Bennett, Morristown, and Fritz E. Froehlich, New Shrewsbury, N.J., assignors to Bell Telephone Laboratories, Incorporated, New York, N.Y., a corporation of New York Filed Aug. 29, 1961, Ser. No. 134,649
12 Claims. (Cl. 178—66)

This invention relates to synchronous data communications systems in general and more specifically to the recovery of synchronization and message signals in such systems.

In the copending applications of Paul A. Baker, Serial No. 49,544, filed August 15, 1960, and Serial No. 120,312, filed June 28, 1961, now United States Patents Nos. 3,128,343 and 3,128,342, both issued April 7, 1964, data communication systems are disclosed in which binary on-off data signals are transmitted in bit pairs by a relative phase shift encoding of the transmitted carrier wave. Serial data are converted into bit pairs, or dibits as Baker styles them, which are effective to shift the start or epoch angle of the transmitted carrier wave during each signal interval by a multiple of 45 degrees with respect to the epoch angle of the previous dibit. The relative phase of one dibit, with respect to the previous dibit, is indicative of the message intelligence transmitted.

An important feature of this data communications system is that at least a 45-degree phase shift is effected even in the case of repeated dibit pairs occurring in a message. This feature makes the dibit transmission rate inherent in the message signal so that it becomes unnecessary to transmit a separate synchronizing signal or timing wave in addition to the message signal. In the copending application of M. A. Logan, Serial No. 49,545, filed August 15, 1960, now United States Patent No. 3,020,479, issued February 6, 1962, one novel synchronization recovery system is disclosed. In the Logan system the synchronization signal is recovered from the constant difference frequency existing between the shifting principal sidebands of the transmitted carrier wave.

Baker recovers the message signal in his receiver in a stored reference system by delaying each successive dibit by one dibit interval and intermodulating the previous and present dibit phases. Integration of the intermodulated carrier phases results in positive and negative voltages representative of individual bits of the message signal.

It is, accordingly, an object of this invention to improve and simplify the recovery of synchronization signals in a phase-modulated data transmission system.

It is a further object of this invention to improve and simplify the recovery of message signals in a phase-modulated data transmission system.

It is a still further object of this invention to combine the recovery of synchronizing and message signals in a phase-modulated data transmission system in a single apparatus.

It is yet another object of this invention to utilize the principles of frequency modulation detection to demodulate both message and synchronization components of a phase-shift data transmission signal.

It is an additional object of this invention to recover synchronization and message information from a relative phase-shift data transmission signal without supplying or generating any absolute reference phase.

According to this invention, broadly stated, a synchronization or timing wave is recovered from a digitally phase-modulated wave by taking the time derivative of the phase transitions in the transmitted wave. The time derivative of the transmitted wave is obtained by translating the incoming phase-modulated wave to a high frequency, removing one of the sidebands, and applying the resultant sideband to a slope-detecting or discriminator circuit. The time derivative then appears as an amplitude-modulated wave which is separable from higher frequency components in an envelope detector. Polarity ambiguities are removed by a full-wave rectification of the envelope detector output and a tuned circuit smooths the rectified wave into a sinusoidal timing wave.

The message signal is inherent in the output of the envelope detector and is recoverable therefrom with the aid of the timing wave by sampling the amplitude of the envelope-detected wave at the timing rate or by integrating the envelope-detected wave over the timing interval. Thus, common circuitry is exploited to recover both timing and signal information.

According to a feature of this invention, the sidebands of the transmitted wave in which the timing information resides can be moved arbitrarily close to the carrier frequency to avoid the effects of delay distortion in the transmission medium by properly shaping the phase transitions in the transmitted signal. At the same time the transmission bandwidth required in prior art systems for synchronization information is substantially reduced. Recovery of the timing wave proceeds in the same way as outlined above except that a subharmonic of the timing wave results. This may be adjusted to the proper frequency by means of a frequency multiplier in the conventional manner.

An important feature of this invention is that the same circuitry is usable in recovering both the timing and message signals.

Another feature is that the data is recovered directly from the phase transitions and no stored reference-phase or comparison of successive phases of the carrier is required.

An advantage of the recovery system of this invention is that it is tolerant of delay and amplitude distortion in the transmission medium.

Another advantage is that an improved signal-to-noise ratio results. The noise contribution of a stored reference phase system is eliminated.

A further advantage is the freedom from a fixed requirement on the ratio of carrier wave frequency to signaling rate for the transmitted signal. This reduces the effects of frequency shift caused by an imperfect transmission medium.

Numerous other objects, features and advantages of this invention will be appreciated from a consideration of the following detailed description together with the drawing in which.

In representative digital phase-modulation systems, such as are disclosed in the above-mentioned Baker applications, after a few initial random dibits have been transmitted as a start signal, the phase of the last random dibit becomes the reference carrier phase for the first message dibit. The absolute phase of the last element serving as a reference is immaterial since it is the relative change of phase between successive dibits that encodes the signal elements. The first message dibit comprises another signal element of the same carrier frequency but displaced in phase relative to the previous element by an odd integral multiple of some minimum phase angle, such as $\pi/4$ radians (45 electrical degrees). The phase changes are thus $\pi/4$, $3\pi/4$, $5\pi/4$ or $7\pi/4$ radians. Succeeding message dibits use the phase of the immediately preceding dibit as their reference at all times.

The output wave from a phase-modulation system as described by Baker may be represented by the following equation:

$$E(t)=A\cos[\omega_0 t+\varphi(t)] \quad (1)$$

where $E(t)$=the instantantaneous amplitude of the modulated carrier wave;
$A$=the maximum amplitude of the wave;
$\omega_0$=the carrier frequency;
$t$=time; and
$\varphi(t)$=the time-varying carrier phase angle corresponding to the data and occurring at the dibit transmission rate.

Figure 1:
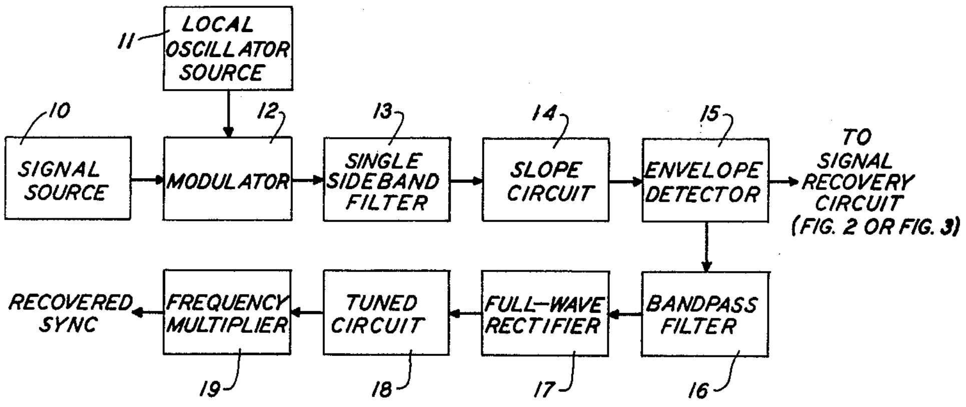
FIG. 1 is a block diagram of the timing recovery system of this invention.

Referring now to FIG. 1, a signal of the form of Equation 1 is assumed to be generated in signal source 10, which may be a transmitter and telephone transmission line as described by Baker. The remainder of the system is assumed to be remotely located from signal source 10. If the carrier frequency $\omega_0$ and the time-varying phase angle $\varphi(t)$ are comparable in magnitude, say differing by a factor of less than two-to-one, there will be overlapping sidebands impossible to separate by common filtering techniques. Accordingly, the incoming signal is translated upwards in frequency from the original carrier level in product modulator 12 which is switched by the output of a local oscillator source 11. The frequency of oscillator source 11 is arbitrary, but it must be higher than the highest frequency sideband in the incoming signal. In a phase-modulated signal this is higher than the sum of the carrier frequency and the dibit transmission rate. Modulator 12 and oscillator source 11 are of any well known type.

The output of modulator 12 includes upper and lower sidebands. Only one sideband is needed and consequently, only one, preferably the upper, is passed by single sideband filter 13. The signal in the output of filter 13 is represented as follows:

$$G(t)=A\cos[(\omega_0+\omega_c)t+\varphi(t)] \quad (2)$$

where $\omega_c$=the frequency emitted by oscillator source 11.

It will be noted that phase angle $\varphi(t)$ remains the same as in Equation 1, but the carrier component is now $\omega_0+\omega_c$.

Figure 3:
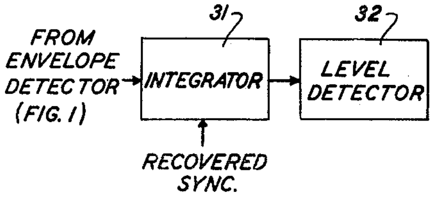

The time-varying phase $\varphi(t)$ can be converted to a frequency in a slope detector or frequency discriminator. Such circuits are well known and are described, for example, in Chapter 13 of H. S. Black's Modulation Theory (D. Van Nostrand and Company, Inc., New York, 1953). FIG. 13-3 on page 213 is an appropriate balanced frequency modulation detector circuit. Slope circuit block 14 represents such a discriminator circuit. The time derivative of the wave of Equation 2 is obtained from circuit 14 and is represented, except for constant multipliers, as follows:

$$G'(t)=[\omega_c+\omega_0+\varphi'(t)]\sin[(\omega_c+\omega_0)t+\varphi(t)] \quad (3)$$

where $\varphi'(t)$=the time derivative of the phase angle $\varphi(t)$, having the dimension of frequency.

The argument of Equation 3 contains in the term $\varphi'(t)$ the signaling or dibit transmission rate and, since it is low in frequency compared to the frequency of the sine term, can be separated therefrom in a conventional envelope detector as represented by block 15 to yield $$H(t)=\omega_c+\omega_0+\varphi'(t) \quad (4)$$

The term $\omega_c+\omega_0$ in Equation 4 constitutes a direct-current bias voltage which is separable from the term $\varphi'(t)$ in a low-pass or bandpass filter such as filter 16. Because the term $\varphi'(t)$ results from a random coding by the message dibits, it does not have discrete frequency components. However, full-wave rectification produces pulses at the desired rate. Therefore, the ouput of filter 16 is subjected to full-wave rectification in block 17. The pulses are then smoothed in a circuit 18, which is tuned to the expected timing wave frequency.

Frequency multiplier 19 is unnecessary if there has been no special shaping of the transmitted signal. The effect of such special shaping is discussed below.

It can be shown that the function $\varphi'(t)$ contains both timing and message information and that both can be recovered in the circuits of this invention. We assume a function $\varphi(t)$ which closely resembles the phase-modulated wave of the Baker transmitter. Two restraints are placed on the function. First, the phase difference between two successive dibit intervals of length T (a time dimension) is proportional to the four quaternary phase states to be transmitted. Thus, $$A, B, C, D \text{ is proportional to } \varphi(NT)-\varphi[N-1)T] \quad (5)$$

where $A$, $B$, $C$ and $D$=phase shifts of $\pi/4$, $3\pi/4$, $5\pi/4$ and $7\pi/4$ radians, respectively; and
$N$=an integer representing the numerical order of the dibit interval.

Second, the transmitted wave must exhibit smooth phase transitions. This is accomplished in Baker by the raised cosine amplitude shaping of the transmitted wave. Thus, the time derivative of $\phi(t)$ is zero for all $t=NT$, or $$\phi'(NT)=0 \quad (6)$$

An expression having the desired properties is as follows:

$$\varphi(t)=\theta_N+K_N\left[\frac{t}{T}-N+1-\frac{1}{2\pi}\sin pt\right] \quad (7)$$

where $\theta_N$=the absolute phase at the start of the $N$th dibit interval;
$K_N$=change of phase between the $(N-1)$ and the $N$th dibit interval, $\pm\pi/4$ or $\pm3\pi/4$; and
$p=2\pi/T$.

$\theta_N$ is defined as a summation as follows:

$$\theta_N=\sum_{n=1}^{N-1}K_n \quad (8)$$

where $$N=1 \text{ for } 0<t\leqslant T$$
$$N=2 \text{ for } T<t\leqslant 2T$$
$$N=3 \text{ for } 2T<t\leqslant 3T$$

etc.

Figure 4:
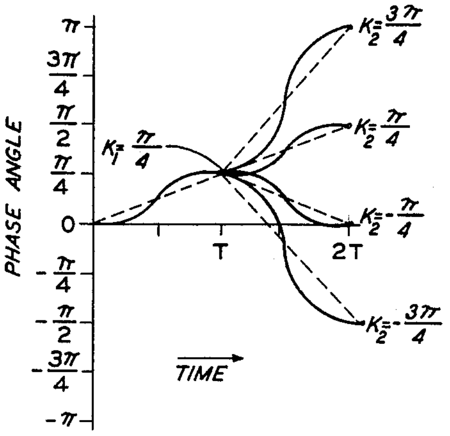
FIGS. 4 and 5 are phase angle diagrams useful in the understanding of the operation of this invention.

An illustration of Equation 7 is given in FIG. 4. This curve starts with a phase change of $\pi/4$ radians in the first interval T and then shows the value of the function for all possible phase changes in the succeeding interval extending from T to 2T. The slope of the straight dashed lines indicates the average rate of change of phase and the solid curves illustrate the actual transition due to the cosine shaping of the transmitted wave. Equations 5 and 6 are verified from the curves by inspection.

Equation 7 can now be substituted in Equation 1. Operation on the resulting wave by the system of the invention as shown in FIG. 1 results in the following evaluation of Equation 3. Thus, at the output of slope circuit 14

$$G'(t)=-\left[\omega_0+\omega_c+\frac{K_n}{T}(1-\cos pt)\right]\sin[\omega_0 t+\omega_c t+\varphi(t)] \quad (9)$$

Since $\omega_0+\omega_c$ is a much higher frequency than $\cos pt$, the envelope detector 15 can remove the higher frequencies, yielding $$H(t)=-\left[\omega_0+\omega_c+\frac{K_N}{T}(1-\cos pt)\right] \quad (10)$$

The output of filter 16 is then $$H_2(t)=\frac{K_N}{T}(1-\cos pt) \quad (11)$$

From FIG. 4, $K_N$ is seen to take on positive and negative values. Rectification prior to recovery of the timing wave is necessary to obtain a sustained output at the timing frequency from tuned circuit 18.

In summary, the phase function of Equations 1 and 2 has been transformed first into a frequency function in slope detector 14 and second into an amplitude function in envelope detector 15.

Figure 2:
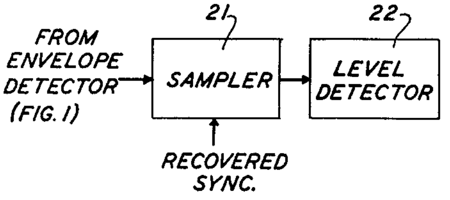
FIGS. 2 and 3 are block diagrams of message signal recovery circuits in accordance with this invention which operate in cooperation with the timing recovery system of FIG. 1.

Equations 4 and 10 show that the message information is also inherent in the output of the envelope detector as the term $K_N$ and can be recovered by either sampling or integrating techniques as diagrammed in FIGS. 2 and 3.

FIG. 2 comprises a conventional sampling circuit 21 to which is applied an output of envelope detector 15 and the recovered timing or sync wave of FIG. 1 and a level detector 22. The timing wave is adjusted in time to sample the signal emerging from the envelope detector at the center of the dibit interval, i.e., at times $NT+T/2$. Thus, Equation 11 becomes $$H_2(NT+T/2)=\frac{K_N}{T}[1-\cos(2\pi N+\pi)]=\frac{2K_N}{T} \quad (12)$$

$K_N$ may have one of four values as shown in FIG. 4 and level detector 22 can provide an output on a different lead for each amplitude value, corresponding to a particular dibit combination. Level detectors or amplitude discriminators are well known in the art and need not be described here in detail.

FIG. 3 is a diagram of another system of recovering signal information from the output of envelope detector 15. Block 31 represents an integrator such as is used in the receiver disclosed in the first Baker application. A capacitor performs the integration there and one may be used in a similar manner here. The recovered sync wave may be used to quench the integrator at the end of each dibit interval. The integration of Equation 11 yields $$Y(t)=\int_{(N-1)T}^{NT} H_2 dt=\int_{(N-1)T}^{NT}\frac{K_N}{T}[1-\cos pt]dt \quad (13)$$
$$=K_N$$

$K_N$ may again assume one of four amplitude levels which may be detected in level detector 32 in a conventional manner. Level detectors 22 and 32 may be similar in construction.

A further improvement in the operation of this invention may be achieved if the phase shaping of the transmitted signal is performed at a lower frequency than half the dibit rate as in the Baker application. A submultiple of the transmission rate is to be preferred. The lower the frequency chosen for shaping, the closer into the carrier frequency are the sidebands containing the timing information in the transmitted signal and the less the transmission bandwidth required for synchronizing information. This means that the timing wave sidebands are subjected to substantially the same delay and attenuation distortion as the carrier frequency in the transmission medium. Thus, a possible disadvantage of the Logan recovery system in which the different sideband pairs are of non-uniform amplitude is overcome to as fine a degree as desired.

Additional shaping of the transmitted wave results in a modification of Equation 7 to the following $$\varphi(t)=\theta_N+K_N\left[\frac{t}{T}-N+1-\frac{1}{2\pi}\sin pt-\frac{A}{2\pi}\sin\frac{p}{m}t\right] \quad (14)$$

where $m$=an integer chosen to give the desired subharmonic of the dibit transmission rate; and $A$=the amplitude of the new shaping.

Figure 5:
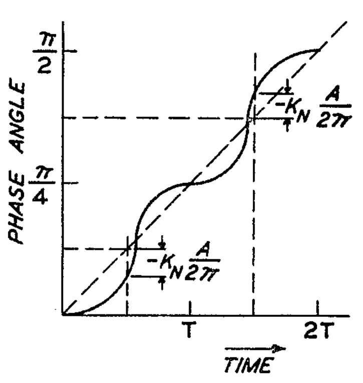

FIG. 5 represents a graph of Equation 14 for $m=2$, and covering a time interval of $2T$ during which two phase changes of $\pi/4$ radians occur. The slope of the dashed line remains the same as that in FIG. 4, but the shape of the solid curve is now non-sinusoidal, being the resultant of two harmonically related frequency components. Substitution of Equation 14 into Equation 1 and letting the system of FIG. 1 operate on the resultant transmitted wave yields $$H_3(t)=\frac{K_N}{T}\left[1-\cos pt-\frac{A}{m}\cos\frac{pt}{m}\right] \quad (15)$$

Equation 15 corresponds to Equation 11 above. Tuned circuit 18 is now tuned to recover the frequency $$\frac{p}{m}$$

and frequency multiplier 19 is brought into play to multiply the initially recovered frequency by $m$ to obtain the desired synchronization signal.

The desired shaping can be applied to the transmitter of either of the Baker applications by one of several methods. For example, the envelope frequency can be divided down in an additional frequency divider to a lower submultiple of the dibit rate and applied to the envelope modulators in addition to the present envelope modulation frequency. Another method is to phase modulate the output of the master oscillator at the desired subharmonic before applying the master oscillator pulses to the binary counter controlling the binary counter chains or ringing circuits from which the carrier wave is derived.

The phase modulation systems taught by Baker operate preferably in the voice frequency range. Consequently, the dibit transmission rate allows fewer than two cycles of carrier per dibit interval with the result that the timing rate cannot be separated from the carrier by ordinary filters. This is the reason for the translation of the incoming signal to a higher frequency level in modulator 12 of FIG. 1. However, in other systems using Baker's operating principles a higher carrier frequency may be used on the line. In this case the initial frequency translation in modulator 12 can be dispensed with, and the incoming signal can be applied directly to the slope circuit 14 without the use of single-sideband filter 13.

An alternate to the use of blocks 12 and 13 to produce a single sideband signal is the phase-discrimination modulator shown in FIG. 11–3 on page 173 of the aforesaid H. S. Black book. This latter method eliminates the single sideband filter but requires phase-shifting networks for both signal and carrier components and two modulators. The phase-splitting circuit necessary for use with the signal components may be that inherent in the delay line used in the receiver circuit of the first P. A. Baker patent application. The synchronous rate recovery system of this invention then becomes a direct replacement for the difference frequency recovery system of M. A. Logan.

It will be understood that this invention is susceptible to modification in order to adapt it to different usages and conditions within the spirit and scope of the appended claims.

What is claimed is:

1. In a data communications system in which binary digital data are encoded at a synchronous rate in pairs as relative phase shifts of a carrier wave in multiples of 45 electrical degrees, means for recovering a synchronizing signal from a carrier wave phase shifted in accordance with binary digital data at a synchronous rate comprising a slope circuit operating on the phase-shifted carrier wave for deriving a signal representative of the time derivative of the synchronous rate occurring therein, an envelope detector for separating from the time derivative signal derived in said slope circuit a frequency component representing said synchronous rate and other frequency components including the frequency of said carrier wave, a full-wave rectifier for removing polarity ambiguities from the frequency component at said synchronous rate separated by said detector and producing a unipolar output, and means smoothing the unipolar output of said rectifier into a single frequency wave indicative of said synchronous rate.

2. The data communications system according to claim 1 in which said slope circuit is a balanced frequency modulation detector.

3. In a data communication system in which binary digital data are encoded in pairs at a synchronous rate as relative phase shifts of a phase-modulated carrier wave in multiples of 45 electrical degrees and in which the frequency of the carrier wave is less than twice that of the synchronous rate a receiver comprising a source of oscillations having a frequency higher than the sum of the frequencies of said carrier wave and said synchronous rate, means modulating said phase-modulated wave with the oscillations from said source in order to discriminate between said carrier frequency and said synchronous rate, a filter connected to said modulating means for passing a single sideband only therefrom, a slope circuit for deriving a signal containing the time derivative of the change of carrier phase in said single sideband, an envelope detector for separating the frequency component representing said synchronous rate from other frequency components at the frequency of said carrier wave in said time-derivative signal at distinct output points, a full-wave rectifier for removing polarity ambiguities from the synchronous-rate component emanating from said detector at one of said output points and producing a unipolar output, and means smoothing the unipolar output of said rectifier into a single-frequency wave indicative of said synchronous rate.

4. A data communication system according to claim 3 in which means recovering the data encoded in the phase changes of said carrier wave is coupled to the other output point of said envelope detector.

5. A data communications system according to claim 4 in which said data recovery means comprises means controlled by the single-frequency wave from said smoothing means sampling the amplitude of the other frequency components from said envelope detector once each data period, there being four possible amplitude levels generated by said sampling means, and an amplitude level detector for discriminating between the four possible amplitude levels of the signal generated by said sampling means corresponding to the several data bit pairs encoded in said phase-modulated carrier wave.

6. A data communications system according to claim 4 in which said data recovery means comprises means integrating the frequency components at the frequency of said carrier wave from said envelope detector over the data bit period to obtain discrete amplitude levels corresponding uniquely to each possible data bit pair, and means for detecting the several amplitude levels attained in said integrating means in each data period as an indication of the data bit pairs encoded in said phase-modulated carrier wave.

7. A system for the recovery of synchronization and message wave information from a binary encoded phase-shift carrier wave signal comprising a frequency discriminator for obtaining a wave representative of the time derivative of said phase-shift carrier wave signal, an envelope detector for separating from the time-derivative wave a first signal proportional to phase changes in the carrier wave and a second signal containing carrier frequency components, rectifying means compensating for polarity ambiguities in said first signal from said envelope detector, resonant circuit means coupled to said rectifying means producing a sinusoidal synchronization wave, and means sampling said second signal from said envelope detector once each cycle of said synchronization wave to demodulate said message wave.

8. An arrangement for recovering a synchronization wave from a synchronously phase-modulated carrier wave comprising means translating said carrier wave to a frequency level exceeding the sum of the frequencies of said carrier wave and said synchronization wave and producing upper and lower sidebands about said frequency level, means selecting a single one of said sidebands from said translating means, means differentiating said selected single sideband wave to produce a wave including an alternating-current envelope representing the time derivative of the energy therein, means recovering the alternating-current envelope of said time-derivative wave, means rectifying said alternating-current envelope to remove any polarity ambiguity therefrom and to produce thereby a unidirectional wave, and resonant circuit means transforming said unidirectional wave into a wave at the frequency of said synchronization wave.

9. In combination, a source of synchronous binary data encoded as relative phase shifts of a carrier wave having a frequency comparable in magnitude to the synchronous rate, means translating the carrier wave from said source to a frequency level removed from any sidebands generated in said source and producing a wave having upper and lower sidebands about said frequency level, means coupled to said translating means selecting one of said last-mentioned sidebands, discriminator means coupled to said selecting means transforming the change-of-phase component inherent in the selected sideband to a wave having frequency components corresponding to the rate of change of phase of said carrier wave and also at the frequency of said carrier wave, envelope detection means coupled to said transforming means separating said frequency components corresponding to the rate of change of phase of said carrier wave, from other frequency components at the frequency of said carrier wave, means for full-wave rectifying the frequency components corresponding to the rate of change of phase from said envelope detection means to reduce said frequency components to a direct current wave having a single frequency component superimposed thereon, and tuned circuit means coupled to said rectifying means recovering said single-frequency component from said direct-current wave, said single-frequency component being proportional to the synchronous rate for said binary data.

10. In a data communications system in which digital data are encoded in pairs at a synchronous rate as discrete relative phase shifts of a carrier wave, a modulation component subharmonically related to the synchronous rate at which data are encoded is superimposed on the carrier wave, and a transmission path conveys the modulated carrier wave to a remote point: receiving means at said remote point for recovering synchronization and message data from said modulated carrier wave comprising modulating means for translating the frequency level of said modulated carrier wave to a frequency level such that the sidebands corresponding to the synchronization wave can be separated from the pure carrier frequency, a filter connected to said modulating means for selecting the upper sideband appearing in the output of said modulating means, a differentiating circuit for taking the time derivative of said selected sideband, an envelope detector connected to said differentiating circuit for separating low-frequency modulation components from high-frequency components at the frequency of said carrier wave, a bandpass filter connected to said envelope detector for passing the frequency of the subharmonic of the synchronizing rate superimposed on said carrier wave, rectifier means connected to said bandpass filter for removing polarity ambiguities from said subharmonic frequency, a resonant circuit tuned to the frequency of said subharmonic frequency coupled to the output of said rectifier means, frequency-multiplying means coupled to said resonant circuit for translating said subharmonic frequency to the desired synchronizing frequency, means controlled by said multiplying means sampling the carrier frequency components from said envelope detector at the synchronous rate to determine the amplitude and polarity thereof, and level detector means for deriving output signals corresponding to the message data encoded in said modulated carrier wave.

11. In a data communications system in which digital data are encoded in pairs at a synchronous rate as discrete relative phase shifts of a carrier wave, an amplitude modulation component proportional to the cosine of a frequency subharmonically related to said synchronous rate and phased to be at a minimum amplitude during phase transitions in the carrier wave is superimposed thereon, and a transmission path conveys the modulated carrier wave to a remote point: receiving means at said remote point for recovering synchronization and message data from said modulated carrier wave comprising modulating means for translating the frequency level of said modulated carrier wave to a frequency level such that the sidebands corresponding to the synchronization wave can be separated from the pure carrier frequency, a filter connected to said modulating means for selecting the upper sideband appearing in the output of said modulating means, a differentiating circuit for taking the time derivative of said selected sideband, an envelope detector connected to said differentiating circuit for separating low-frequency modulation components from high-frequency components at the frequency of said carrier wave, a bandpass filter connected to said envelope detector for passing the frequency of the subharmonic of the synchronizing rate superimposed on said carrier wave, rectifier means connected to said bandpass filter for removing polarity ambiguities from said subharmonic frequency, a resonant circuit tuned to the frequency of said subharmonic frequency coupled to the output of said rectifier means, frequency-multiplying means coupled to said resonant circuit for translating said subharmonic frequency to the desired synchronizing frequency, means controlled by said multiplying means sampling the carrier frequency components from said envelope detector at the synchronous rate to determine the amplitude and polarity thereof, and level detector means for deriving output signals corresponding to the message data encoded in said modulated carrier wave.

12. In a data communication system in which digital data are encoded in pairs at a synchronous rate as discrete relative phase shifts of a carrier wave, a phase modulation component having a period equal to that of a submultiple of the synchronous rate is superimposed on the carrier wave, and a transmission path conveys the modulated carrier wave to a remote point: receiving means at said remote point for recovering synchronization and message data from said modulated carrier wave comprising modulating means for translating the frequency level of said modulated carrier wave to a frequency level such that the sidebands corresponding to the synchronization wave can be separated from the pure carrier frequency, a filter connected to said modulating means for selecting the upper sideband appearing in the output of said modulating means, a differentiating circuit for taking the time derivative of said selected sideband, an envelope detector connected to said differentiating circuit for separating low-frequency modulation components from high-frequency components at the frequency of said carrier wave, a bandpass filter connected to said envelope detector for passing the frequency of the subharmonic of the synchronizing rate superimposed on said carrier wave, rectifier means connected to said bandpass filter for removing polarity ambiguities from said subharmonic frequency, a resonant circuit tuned to the frequency of said subharmonic frequency coupled to the output of said rectifier means, frequency-multiplying means coupled to said resonant circuit for translating said subharmonic frequency to the desired synchronizing frequency, means controlled by said multiplying means sampling the carrier frequency components from said envelope detector at the synchronous rate to determine the amplitude and polarity thereof, and level detector means for deriving output signals corresponding to the message data encoded in said modulated carrier wave.

References Cited in the file of this patent

UNITED STATES PATENTS 2,979,566 Hopner ---------------- Apr. 11, 1961